Feb. 26, 1935.   F. R. BICHOWSKY   1,992,177
REFRIGERATION
Filed Aug. 31, 1931    3 Sheets-Sheet 1

Patented Feb. 26, 1935

1,992,177

UNITED STATES PATENT OFFICE 1,992,177

REFRIGERATION

Francis R. Bichowsky, Washington, D. C., assignor, by mesne assignments, to General Motors Corporation, a corporation of Delaware Application August 31, 1931, Serial No. 560,362

15 Claims. (Cl. 62—176)

This invention relates to refrigeration.

This application is a continuation in part of my copending application, Serial No. 457,142, filed May 29, 1930.

An object of this invention is to provide an improved method of conditioning air or gas for use in buildings, enclosures and the like, in which the temperature and relative humidity are to be controlled. This method includes the use of a liquid dehydrating agent of great drying power which possesses many advantages entirely lacking in previously used dehydrating agents.

In practicing this invention, I use as the medium of humidification or dehumidification a solution of one or more of the soluble salts of lithium, preferably the soluble group of the lithium halide salts, lithium chloride, lithium bromide and lithium iodide and other lithium salts which have water vapor pressure characteristics of the soluble lithium halide. These salts are preferably used in an aqueous solution in which other substances may be present or absent. Certain substances may be present in addition to the lithium halide salt in any percent which does not detract materially from the properties of the lithium halide solution. Examples of other salts which may be present in the solution are calcium chloride and/or aluminum chloride. These lithium salts are particularly advantageous because their solutions have greater drying power, are less dense, less viscous, have a very favorable specific heat, are stable and non-toxic and may be cooled to a much lower temperature without separation when compared to salt solutions previously used, such as calcium chloride, magnesium chloride or sodium chloride.

These lithium halide solutions may be used in any suitable air or gas conditioning apparatus, and as an example of such an apparatus, I have disclosed in this application one which may be taken as typical and which is used merely as an example to illustrate the wide range of use of my invention.

Further objects and advantages of the present invention will be apparent from the following description, reference being had to the accompanying drawings, wherein a preferred form of the present invention is clearly shown.

Figure 1:
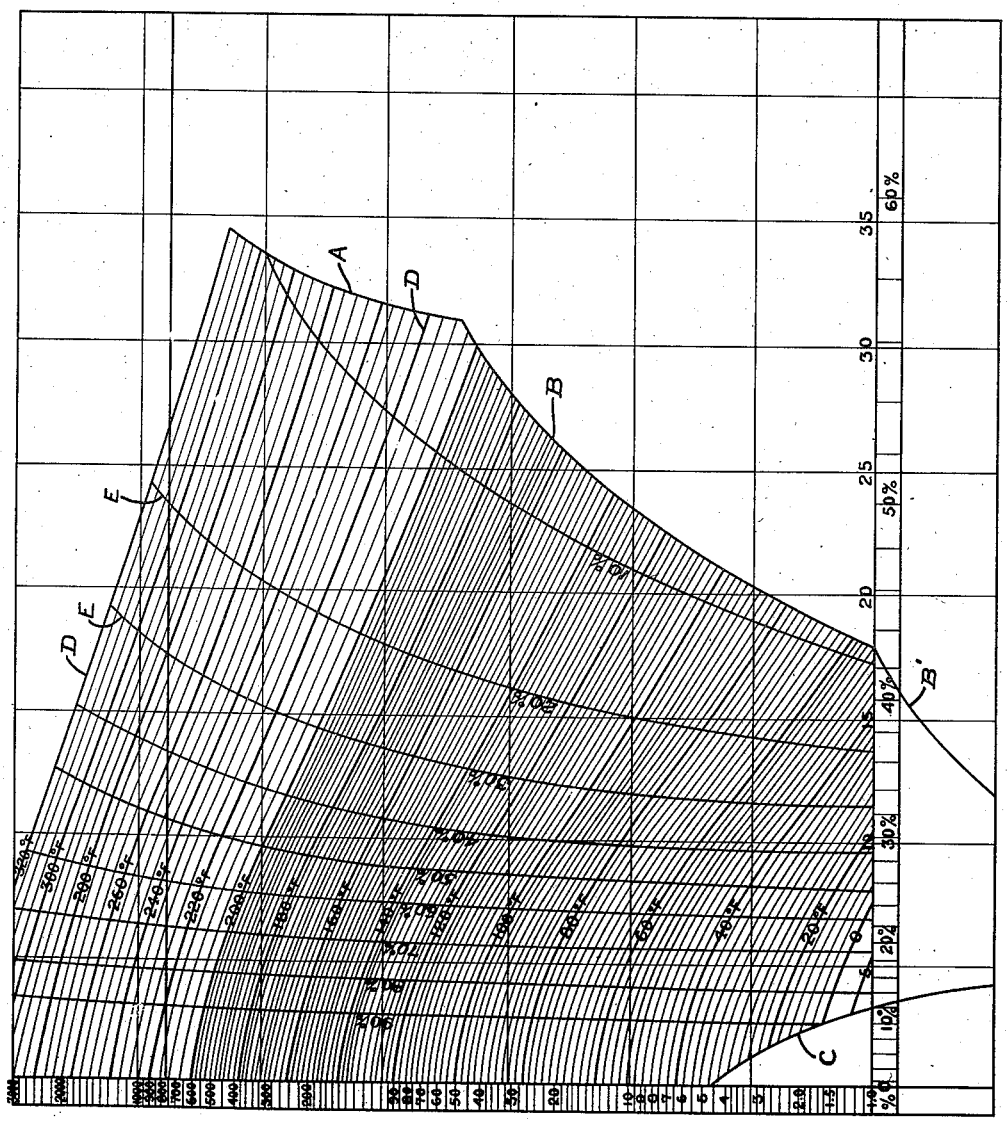
Fig. 1 is a chart indicating certain properties of one embodiment of my dehydrating agent.

In the attached drawings, Fig. 1 is a chart which shows the water vapor pressure of lithium chloride aqueous solution at various degrees of concentration and temperature. In the chart, the limit lines A, B, B' and C indicate the lower limit of temperature and the upper and lower limits of concentration within which the solution is available for use as an air or gas conditioning agent without causing separation of the salt from the water or ice. The lines D indicate the water vapor pressure at a constant temperature and at a varying concentration. The lines E indicate varying temperature and concentration of a solution in equilibrium with air at a given fixed relative humidity. The vertical scale on the left hand side of the chart indicates the vapor pressure of water of the solution measured in millimeters of mercury. The lower horizontal scale, having numbers followed by the percent symbol, indicates concentration of the solution in weight percent of anhydrous lithium chloride while the scale above, having numbers without the percent symbol, indicates mols per 1000 grams of water. The curves A, B and B' represent the temperature and concentration at which the salts of lithium chloride, namely an anhydrous lithium chloride, lithium chloride mono-hydrate, and lithium chloride dehydrate would begin to separate from the solution. The curve C represents the temperature, pressure and concentration of a solution from which ice would begin to separate.

Figure 2:
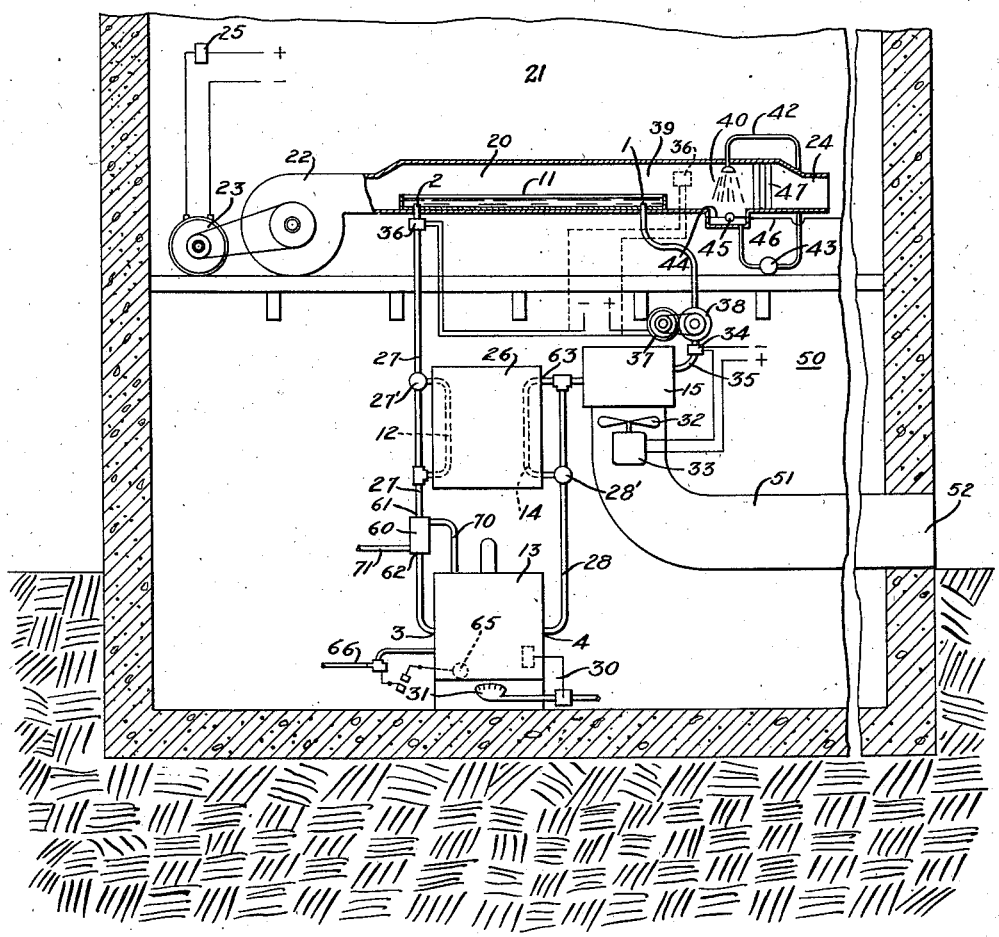
Fig. 2 is a diagrammatic view of an apparatus embodying features of the invention.
Figure 3:
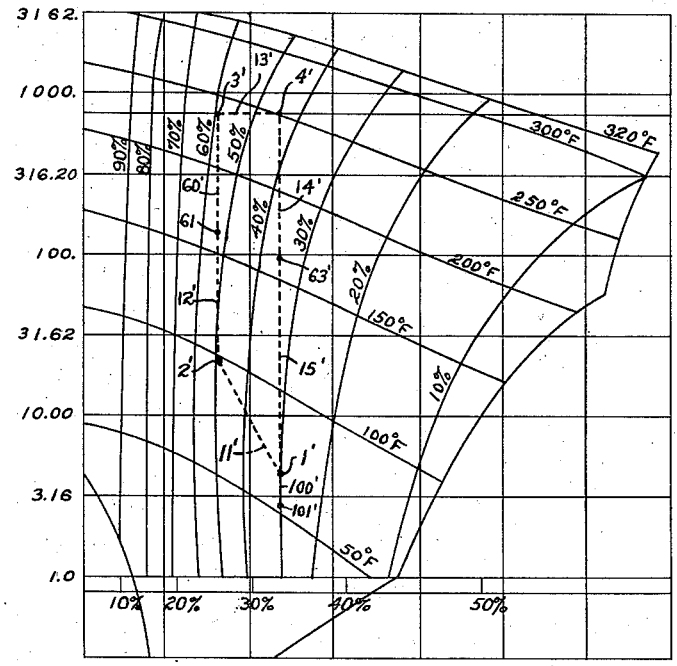
Fig. 3 is a chart, somewhat similar to Fig. 1, but on a reduced scale, indicating an application of the chart to specific conditions.

Fig. 2 indicates an apparatus in which the lithium halide solution may be used to condition air or gas, and Fig. 3 indicates how the chart of Fig. 1 is used to ascertain the necessary temperature and concentration values which are to prevail in the apparatus shown in Fig. 2.

In the apparatus shown in Fig. 2, air, or gas, is contacted with the lithium halide solution in the zone 20. The air from the room 21 is circulated through the zone 20 by a fan 22 operated by a motor 23. The air is discharged through the outlet 24 of the apparatus back into the room 21. The intake for the blower 22 may be in the room 21, may be outside of the room 21, or it may be partly inside and partly outside of the room 21. A thermostat 25 is placed in the room 21 to maintain the air in the room at a substantially constant temperature between predetermined temperature limits by either completely starting and stopping the motor 23, or by otherwise regulating the motor.

The lithium halide solution is circulated in a closed cycle so that a portion of solution is contacting with the air in the zone 20 while another portion is being concentrated. The solution may be contacted with the air in any suitable contact apparatus such as the pan 11. The concentrated solution enters the pan 11 at the inlet 1 and leaves at the outlet 2. The solution which leaves through the outlet 2 is concentrated and returned to inlet 1. This concentration may be accomplished in any suitable manner, such as by first partially heating the solution at 12 in the heat exchanger 26. Thereafter the solution may continue through the pipe 27 to interchanger 60 where it is further heated by steam from the concentrator 13. The steam passes from the concentrator 13 through the pipe 70 to the interchanger 60, the condensate leaving through the pipe 71 to any desired place. From the interchanger 60 the solution continues to the concentrator 13, entering the same at the point 3 and leaving at the point 4. The concentrated solution then passes through the pipe 28 and may be partially cooled at 14 in the interchanger 26 after which it may be further cooled in the solution cooling device 15. From thence the solution continues and returns to the inlet 1 of the contacting device 11.

The solution preferably is concentrated to a predetermined degree of concentration by any suitable method. The concentration may be automatically accomplished by providing a thermostat 30 which automatically maintains the temperature of the solution in the concentrator 13 at the proper boiling point for any particular pressure as indicated by the chart of Fig. 1. The evaporator may be maintained at atmospheric pressure, and the thermostat 30 may be set at the boiling point, under atmospheric pressure, of solution concentrated to the proper degree. The thermostat 30 controls the source of heat, such as the gas burner 31 to maintain the solution at a substantially constant temperature which provides the correct concentration under the particular evaporator pressure selected.

The solution after being concentrated, may be given a predetermined temperature for contact with the air. For instance the final desired temperature may be imparted to the concentrated solution in the solution cooler 15. The thermostat 34 placed in the air outlet pipe 35 of the cooler 15, regulates the operation of the fan 32 and motor 33 by completely starting and stopping the same between predetermined temperature limits. The air for cooling the solution may be taken either from the room 50 or from the outside atmosphere, thence may pass through the cooler 15 and may be discharged through the conduit 51 through the outlet 52 to the exterior of the building. If the cooler 15 is to be cooled by water instead of by air, the thermostat 34 may regulate the flow of the cooling water to or from the cooler 15.

The air treated in the zone 20 is thus automatically given a predetermined temperature and relative humidity. This is insured by providing a sufficient opportunity of contact between the air and the solution so that there is substantially 100% equilibrium between the solution and the air, or a substantially constant differential between the air and the solution.

Thus there is provided at the point 1 at least enough or more solution to maintain the air passing thereover at the predetermined temperature and relative humidity. This supply may be either of a constant volume sufficient to meet the greatest demand, or it may be automatically varied in accordance with the demand for the solution. To this end a thermostat 36 may be provided near the contact device 11, which thermostat automatically maintains a sufficient quantity of solution at the point 1. The thermostat 36 controls a motor 37 which operates the pump 38 in the pipe 35 which supplies solution to the contact device 11. Since the temperature of the solution near the thermostat 36 is a function of the demand upon the drying power of the solution, the thermostat 36 is set to provide a sufficient quantity solution at the point 1 in order to accomplish the result desired.

By the action of the solution on the air in the zone 20, a relatively dry air of predetermined temperature and predetermined relative humidity may be obtained at the point 39 and may be discharged into the room 21 without further treatment. However, if it is desired to provide air which is not so dry, but of a lower temperature, then the air may be subjected to a moistening action in the zone 40. A source of water supply for moistening the air may be provided at this zone 40. A spraying device 41 is supplied with water through the pipe 42 leading from the pump 43 which receives water from a sump 44. The water evaporated in the zone 40 is automatically replaced by controlling the level of the water in the sump 44 by means of a float 45 which operates a valve in the pipe 46 leading from a suitable supply of water, such as a city water main. The pump 43 may be conveniently operated either by the motor 23, or by a separate motor preferably placed in electrical parallel relation with the motor 23 so that the action of the pump 43 is automatically controlled by means of the thermostat 25. If necessary suitable eliminators 47 may be provided in the apparatus in order to remove any entrained moisture in the air from the spray 40, and the eliminators 47 may drain into the sump 44.

Fig. 3 shows how the chart of Fig. 1 may be used to determine what particular values of temperature or concentration of the solution are necessary in the various parts of the apparatus shown in Fig. 2. Thus if the air in the room 21 is to be maintained at 70° F. by setting thermostat 25 at this value, then the thermostat 34 and the device 30 may be set so that the solution entering at the point 1 is at 60° F and 30% relative humidity. This is indicated on the chart shown in Fig. 3 by the point 1' where the lines for these values intersect. The line 11' in Fig. 3 indicates that the solution in the contact device 11 of Fig. 2 has its temperature raised to say 100° F. and 50% relative humidity, and this point is indicated on the chart in Fig. 3 at the point 2'. The thermostat 36 may thus be set to operate the pump 38 to maintain the solution at the point 2 at the indicated temperature. The change in temperature of the solution in the interchanger 26 is indicated on the chart of Fig. 3 by the line 12' so that the solution leaves the interchanger 26 at the temperature indicated by the point 61' of Fig. 3. The solution is then heated in interchanger 60 by exhaust steam from evaporator 13 to a temperature indicated on Fig. 3 as point 3' which is equal substantially to the boiling point of the concentrated solution. The increase in temperature in the interchanger 60 is indicated by the line 60' in Fig. 3. The change in temperature and concentration of the solution in the evaporator 13 is indicated by the line 13' in Fig. 3 so that the solution leaving the concentrator at the point 4 has the value indicated by the point 4' in Fig. 3. The thermostat 30 may be set to maintain the concentration of the solution in the evaporator 13 at these values since it is set at the boiling point of a solution of proper concentration, and the source of heat 31 is made greater than any demand to be placed on it. In this manner heat continues to be supplied as long as necessary. The cooling in the interchanger 26 of the solution passing through the part 14 of pipe 28 is indicated in Fig. 3 by that portion of the line numbered 14', terminate at the point 63' while the further cooling in the cooler 15 is indicated by that portion of the line 15' in Fig. 3, terminating at the point 1'.

It may be necessary because of losses of temperature in the pipe 35 to cool the liquid to some temperature $x$ in order that the liquid will arrive at the point 1 of the apparatus at the proper temperature. This process of cooling is shown on the chart by that portion of the line numbered 100' terminating at the point 101'.

Figure 4:
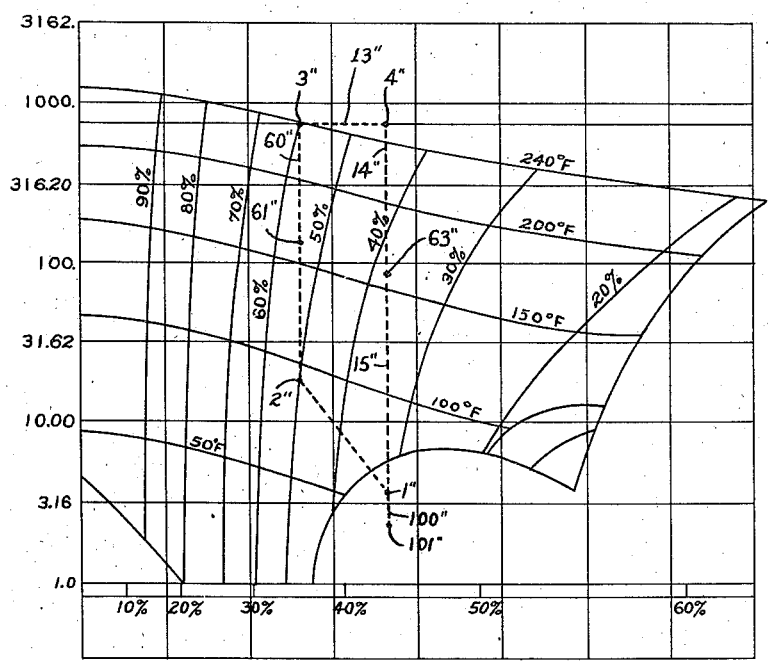
Fig. 4 is a chart, similar to Fig. 3 but showing characteristics of calcium chloride solution and showing its unsuitability for the purpose of the invention.

The foregoing process cannot be performed with $CaCl_2$ solution as will be evidenced by comparison of Figs. 3 and 4, since the parts corresponding to 1' and 101', namely 1'' and 101'', in Fig. 4 lie in a region where the solution would separate in part, the solid salt calcium chloride hexahydrate ($CaCl_2.6H_2O$). This separation of solid salt would make circulation of the mixture impractical.

In the chart of Fig. 4 the points indicated by numbers having ('') correspond in temperature and relative humidity to the point indicated in Fig. 3 by similar numbers having (').

The following table indicates advantages of lithium chloride solution over calcium chloride solution when the solutions are used to impart to air 70°F. temperature and 30% relative humidity, assuming 100% efficiency:

|  | LiCl | CaCl |
|---|---|---|
| Temperature | 70° F. | 70° F. |
| Humidity | 30% | 30% |
|  | Liquid | Salt separates |
| Boiling point | 255° F. | 255° F. |
| Freezing point below | −15° F. | 76° F. |
| Density | 1.20% | 1.43% |
| Viscosity | 5.0% | 9.0% |
| Concentration | 34% | 44% by weight |

Another advantage of the use of solutions of salts of lithium as air conditioning mediums is that they are equally as effective for use as heating and humidifying agents under winter conditions. The apparatus shown in Fig. 2 may be used to warm and humidify air, in winter for instance, by changing the three-way valves 27' and 28' in order to by-pass the interchanger 26. The settings for the temperatures and degrees of concentration also are to be changed for winter conditions. If it is desired to maintain 70° F. 30% relative humidity conditions during winter outside temperatures, it is possible to introduce solution at the point 1, Fig. 2, at 105° F. and to impart 10% relative humidity to the air. This permits sufficient heat to be imparted to the air so that heat losses from the building may be compensated. When the air at 105° F. and 10% relative humidity is cooled to 70° F. upon being dispersed into the space 21, it will have 30% relative humidity and thus fulfill the requirements. With the use of lithium chloride solution for this purpose the solution can be concentrated to the point where it imparts only 10% relative humidity to air at 105° F.; but with calcium chloride solution it is impossible to obtain sufficient concentration. Solid salts $CaCl_2.2H_2O$ and $CaCl_2.4H_2O$ separate out before this concentration is reached.

For winter conditions the cooler 15 and spraying device 40 are rendered inoperative, the interchanger 26 is by-passed out of the system by changing valves 27' and 28'. The thermostat 30 is regulated to maintain a temperature, for instance, of 105° F. and the hydrometric device 65 of any well-known type is placed in operation to add water through the pipe 66 to maintain the solution in the heater 13 at the proper degree of concentration to impart to the air at 1 the proper relative humidity, for instance 10%.

While the form of embodiment of the invention as herein disclosed, constitutes a preferred form, it is to be understood that other forms might be adopted, all coming within the scope of the claims which follow.

What is claimed is as follows:

1. The method of conditioning a gas carrying water vapor which comprises contacting said gas with a solution containing a relatively soluble lithium halide salt concentrating said solution after contact with said gas by heating said solution, subjecting said solution to a cooling action, stopping said cooling action before solid salt separates and recontacting the solution with said gas.

2. The method of conditioning a gas carrying water vapor which comprises contacting said gas with a solution containing a relatively soluble lithium halide salt, concentrating said solution after contact with said gas automatically to a predetermined degree of concentration by heating said solution, subjecting said solution to a cooling action, stopping said cooling action before solid salt separates, and recontacting the solution with said gas.

3. The method of conditioning a gas carrying water vapor which comprises contacting said gas with a solution containing a lithium halide salt, concentrating said solution after contact with said gas without formation of solid salt, and recontacting the concentrated solution with said gas without the formation of solid salt.

4. The method of conditioning a gas carrying water vapor which comprises contacting said gas with a solution containing a lithium halide salt, concentrating said solution after contact with said gas, maintaining said concentrated solution automatically at a predetermined temperature above the temperature at which solid salt separates, and recontacting the concentrated solution with said gas.

5. The method of conditioning a gas carrying water vapor which comprises contacting said gas with a solution containing a lithium halide salt, concentrating said solution after contact with said gas to a predetermined degree of concentration below the concentration at which solid salt separates, cooling said concentrated solution to a predetermined temperature above the temperature at which solid salt separates and recontacting the concentrated solution with said gas.

6. The method of conditioning a gas carrying water vapor which comprises contacting said gas with a solution containing lithium chloride, concentrating said solution after contact with said gas by heating said solution, subjecting said solution to a cooling action and reusing said solution for conditioning gas in the absence of solid lithium chloride.

7. The method of conditioning a gas carrying water vapor which comprises contacting said gas with a solution containing lithium chloride, concentrating said solution after contact with said gas to a predetermined degree of concentration automatically maintained to prevent the formation of solid salt in contact with said gas, and reusing said solution for conditioning gas.

8. The method of conditioning a gas carrying water vapor which comprises contacting said gas with a solution containing a soluble lithium halide salt, concentrating said solution after contact with said gas by heating said solution, subjecting said solution to a cooling action and reusing said solution for conditioning gas in the absence of solid lithium halide salt.

9. The method of conditioning a gas carrying water vapor which comprises contacting said gas with a solution containing a lithium salt having the hygroscopic characteristics of the soluble lithium halide group, concentrating said solution after contact with said gas by heating said solution, subjecting said solution to a cooling action, and reusing said solution for conditioning gas in the absence of solid lithium salt.

10. The method of conditioning air which comprises contacting said air with a solution containing a relatively soluble lithium salt having the hygroscopic characteristics of the soluble lithium halide group and imparting to said air desired temperature conditions, concentrating said solution and using said solution for conditioning air without the presence of solid lithium salt.

11. The method of conditioning air which comprises contacting said air with a solution containing lithium chloride and imparting to said air desired temperature conditions, concentrating said solution and using said solution for conditioning air without the presence of solid lithium salt.

12. A method of conditioning air which includes the steps of progressively subjecting said air to the action of a dehydrating agent in zones of varying concentration of said agent, withdrawing a portion of said dehydrating agent from a zone of lesser concentration, regenerating said withdrawn portion, and returning said regenerated agent to a zone of greater concentration.

13. A method of conditioning air which includes the steps of contacting said air with a circulated hygroscopic liquid of controlled concentration and dehydrating said air to a high degree; contacting said air with a spray of water and imparting thereto conditions of temperature and humidity to place it within the comfort range and reactivating a portion of the hygroscopic liquid to a degree such that when mixed with the rest of said liquid a desired concentration of said mixture is effected.

14. A method of conditioning air which includes the steps of progressively subjecting said air to the action of a dehydrating agent including a solution of a lithium salt having the hygroscopic characteristics of the soluble lithium halide group in zones of varying concentration of said agent, withdrawing a portion of said dehydrating agent from a zone of lesser concentration, regenerating said withdrawn portion, and returning said regenerated agent to a zone of greater concentration.

15. A method of conditioning air which includes the steps of contacting said air with a circulated hygroscopic liquid including a solution of a lithium salt having the hygroscopic characteristics of the soluble lithium halide group of controlled concentration and dehydrating said air to a high degree; contacting said air with a spray of water and imparting thereto conditions of temperature and humidity to place it within the comfort range and reactivating a portion of the hygroscopic liquid to a degree such that when mixed with the rest of said liquid a desired concentration of said mixture is effected.

FRANCIS R. BICHOWSKY.